United States Patent [19]

Hall et al.

[11] Patent Number: 5,179,603
[45] Date of Patent: Jan. 12, 1993

[54] OPTICAL FIBER AMPLIFIER AND COUPLER

[75] Inventors: Douglas W. Hall; William J. Miller, both of Corning; Thomas W. Webb, Horseheads; David L. Weidman, Corning, all of N.Y.

[73] Assignee: Corning Incorporated, Corning, N.Y.

[21] Appl. No.: 671,075

[22] Filed: Mar. 18, 1991

[51] Int. Cl.⁵ ............................ G02B 6/26; G02B 6/42
[52] U.S. Cl. ............................................ 385/24; 385/43
[58] Field of Search .................... 350/96.15; 372/6; 385/24, 43, 50, 51, 27, 28, 30, 39

[56] References Cited

U.S. PATENT DOCUMENTS

| | | | |
|---|---|---|---|
| 4,763,976 | 8/1988 | Nolan et al. | 385/43 |
| 4,877,300 | 10/1989 | Newhouse et al. | 385/43 |
| 4,906,068 | 3/1990 | Olson et al. | 385/43 |
| 4,955,025 | 9/1990 | Mears et al. | 372/6 |
| 5,011,251 | 4/1991 | Miller et al. | 385/43 |
| 5,044,716 | 9/1991 | Berkey | 385/51 |
| 5,066,087 | 11/1991 | Yamauchi et al. | 385/43 |
| 5,098,459 | 3/1992 | Fukuma et al. | 385/51 |
| 5,129,020 | 7/1992 | Shigematsu et al. | 385/43 |

OTHER PUBLICATIONS

Parriaux et al.; "Wavelength Selective Distributed Coupling Between Single Mode Optical Fibers for Multiplexing"; *Journal of Optical Communication;* 2(1981)3, pp. 105–109; Jul. 1981.

Primary Examiner—John D. Lee
Assistant Examiner—Robert E. Wise
Attorney, Agent, or Firm—W. J. Simmons, Jr.

[57] ABSTRACT

Disclosed is a fiber amplifier system in which a gain fiber is operatively combined with a fiber optic coupler having first and second coupler optical fibers. The coupler fibers are fused together along a portion of their lengths to form a wavelength dependent coupling region whereby most of the light power of a wavelength $\lambda_s$ couples between them, and most of the light power of a wavelength $\lambda_p$ that is introduced into the first fiber remains in it. The mode field diameter of the first coupler fiber is substantially matched to that of the gain fiber and is smaller than that of the second coupler fiber. One end of the first coupler fiber is spliced to the gain fiber. A transmission fiber is spliced to the second coupler fiber, and a laser diode introduces pumping light of wavelength $\lambda_p$ to the first coupler fiber. The fiber optic coupler preferably includes an elongated body of matrix glass through which the first and second coupler fibers extend. The matrix glass has a refractive index $n_3$ that is lower than that of the fiber claddings. The fibers are fused together along with the midregion of the matrix glass, the fiber cores being more closely spaced at the central portion of the midregion than at the body endfaces, thereby forming the coupling region.

31 Claims, 3 Drawing Sheets

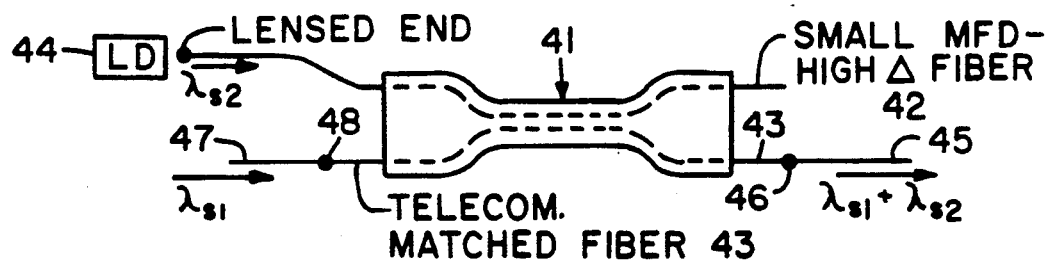
Fig. 6
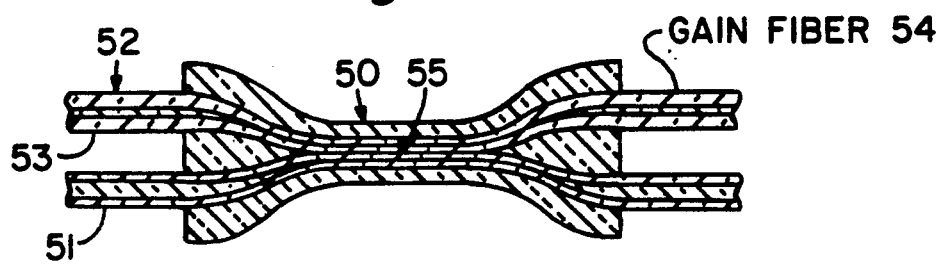
Fig. 7
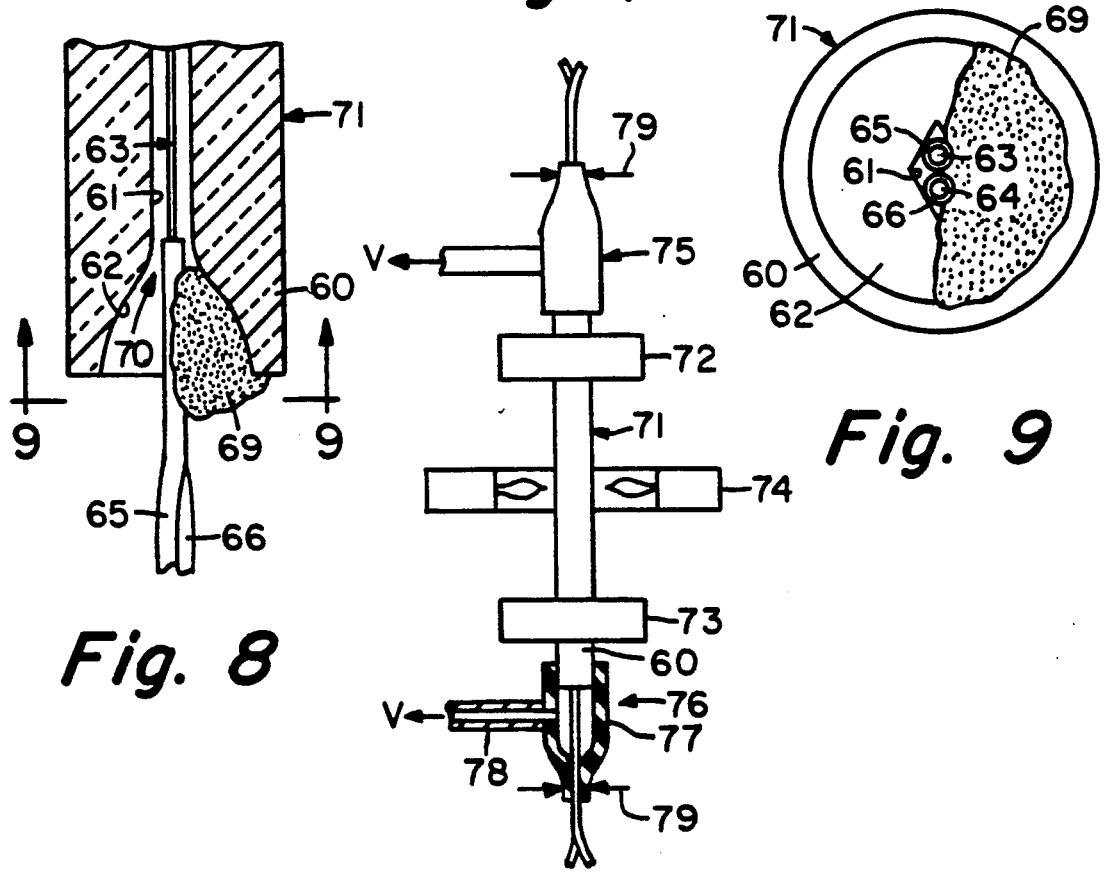
Fig. 8
Fig. 9
Fig. 10

OPTICAL FIBER AMPLIFIER AND COUPLER

BACKGROUND OF THE INVENTION

The present invention relates to optical fiber telecommunication systems and to optical fiber amplifiers and optical fiber couplers that are employed in such systems.

Fiber amplifiers, in which useful gain is afforded by the stimulated emission of radiation, typically include a gain fiber 10 (see FIG. 1), the core of which includes active dopant ions. A wavelength division multiplexer (WDM) fiber optic coupler 11 can be used for coupling pump power of wavelength $\lambda_p$ from laser diode 15 and the signal of wavelength $\lambda_s$ from input telecommunication fiber 14 to gain fiber 10. Such devices are disclosed in U.S. Pat. Nos. 4,938,556, 4,941,726, 4,955,025 and 4,959,837, for example. The fiber pigtails extending from coupler 11 are connected to other optical fibers by fusion splices or butt joint connectors, splices being preferred because of their lower reflection and insertion loss.

In the system of FIG. 1, a splice 16 connects the input fiber 14 to coupler fiber 13, and a splice 17 connects gain fiber 10 to coupler fiber 12. For optimal amplifier operation, the input signal splice loss at splice 16 should be small in order to maximize signal-to-noise (S/N) of the amplifier because in the signal-spontaneous beat noise limit, the electrical S/N of the amplifier depends linearly on the optical coupling efficiency. Also, the splice loss between the coupler fiber 12 and the gain fiber 10 should be low for both good coupling efficiency (for the same S/N reason stated above) and pump coupling efficiency since amplifier gain is related to the amount of pump power coupled to the gain fiber.

Commercially available telecommunication fibers typically have mode field diameters (MFDs) in the range of 9 μm to 11 μm for light at 1550 nm and 6 μm to 8 μm for light at 1000 nm. Conventional WDM coupler 11 is typically formed of two matched fibers that have been chosen to minimize the splice loss to such telecommunication fibers. For relative index differences Δ found in typical telecommunication fibers, a splice loss of less than 0.1 dB is obtained when the ratio of MFD's of the two fibers is less than 1:1.05 at 1550 nm and less than 1:1.14 at 1000 nm.

Gain fibers operate best when intensities of both the pump and signal beams are high. This can be accomplished by providing the gain fiber with a relatively small MFD, a characteristic that causes the optical power to be concentrated in a relatively small area along the fiber axis. Such a "high gain" or "high efficiency" fiber can be achieved by employing a relatively large core/clad Δ and a relatively small core diameter. There is no maximum acceptable MFD for high gain fibers; however, the MFDs of such fibers should be smaller than the MFDs of standard telecommunication fibers, that difference preferably being larger than 1.5:1.

The mode field mismatch between small MFD high gain fiber 10 and large MFD fiber 12 causes high insertion losses at splice 17. Consider, for example, a telecommunication system employing an erbium doped gain fiber having MFDs of 6.4 μm and 3.7 μm at 1550 nm and 1000 nm, respectively. The gain fiber is capable of amplifying signals at wavelengths between 1530 and 1560 nm; of the various possible pump wavelengths, 980 nm is preferred. A splice between that gain fiber and a telecommunication fiber having MFDs of 10.5 μm and 5.7 μm at 1550 nm and 1000 nm, respectively, exhibits splice losses of 0.5 dB and 1.7 dB at 1536 nm and 980 nm, respectively. Such splice loss reduces amplifier gain and the useable output power of the amplifier.

SUMMARY OF THE INVENTION

An object of the invention is to provide an improved fiber amplifier and a telecommunication system utilizing the same. A further object is to provide a WDM coupler for use in a fiber amplifier, such coupler exhibiting low insertion loss for both the pump and signal wavelengths and resulting in low loss splices at connections to both telecommunication fibers and gain fibers.

This invention is based on the discovery that fibers having significantly different MFDs (as a result of different Δ-values and core diameters) can be used to form a WDM coupler that exhibits low insertion loss at both pump and signal wavelengths.

One aspect of the invention concerns a fiber optic coupler having first and second coupler optical fibers. The fibers are fused together along a portion of their lengths to form a coupling region in which optical power couples between them. The coupling is wavelength dependent, whereby most of the light power of a wavelength $\lambda_s$ couples between the first and second coupler fibers, and most of the light power of a wavelength $\lambda_p$ that is introduced into the first fiber remains therein. The mode field diameter of at least a portion of the first coupler fiber is smaller than that of the second coupler fiber; the ratio of the mode field diameter of the second fiber to that of the first fiber is preferably at least 1.5:1.

The first coupler fiber may comprise two segments that are fused together within the coupling region. One of the fiber segments may comprise a gain fiber having a core that is doped with lasing material. The mode field diameters of the two fiber segments can different, or they can be substantially matched.

In a preferred embodiment, the fiber optic coupler comprises an elongated body of matrix glass through which the first and second coupler fibers extend. The matrix glass body, which has two opposed endfaces and a midregion, has a refractive index $n_3$ that is lower than that of the fiber claddings. The fibers are fused together along with the midregion of the matrix glass, the fiber cores being more closely spaced at the central portion of the midregion than at the endfaces, thereby forming the coupling region.

Another aspect of the invention concerns a fiber amplifier comprising signal amplifying gain fiber means in combination with the aforementioned coupler. One end of the first coupler fiber is connected to the gain fiber means. The mode field diameter of the first coupler fiber is substantially matched to that of the gain fiber means.

The fiber amplifier finds utility is a system in which input signal means introduces light power of wavelength $_s$ into the gain fiber means, and pump source means which introduces pumping light power of wavelength $\lambda_p$ to the first coupler fiber. The input signal means may comprise a transmission optical fiber that is connected to the second coupler fiber. Alternatively, the input signal means may comprise a transmission optical fiber an end of which is connected to the gain fiber means, an output transmission optical fiber being connected to the second coupler fiber. The connections between the various fibers are preferably fusion splices.

BRIEF DESCRIPTION OF THE DRAWINGS

FIG. 6 schematically illustrates the use of a mismatched mode field coupler as an input coupler.

FIG. 7 is a cross-sectional view of a further coupler embodiment.

FIG. 8 is a cross-sectional view of one end portion of a coupler preform.

FIG. 9 is a cross-sectional view taken along lines 9—9 of FIG. 8.

FIG. 10 is a schematic illustration of an apparatus for collapsing the coupler preform and drawing the midregion thereof.

DESCRIPTION OF THE PREFERRED EMBODIMENTS

The drawings are not intended to indicate scale or relative proportions of the elements shown therein.

Figure 1:
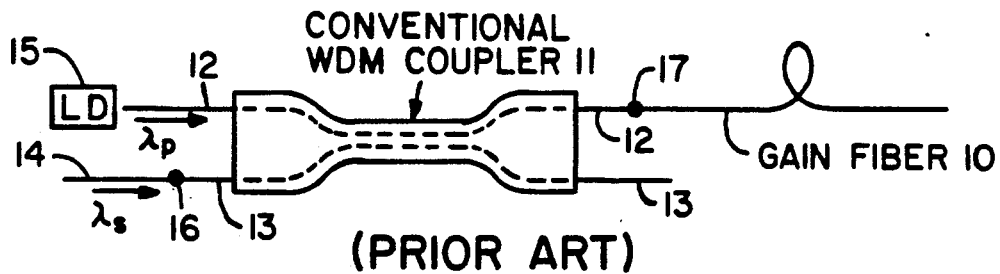
FIG. 1 is a schematic illustration of a typical prior art optical fiber amplifier.
Figure 2:
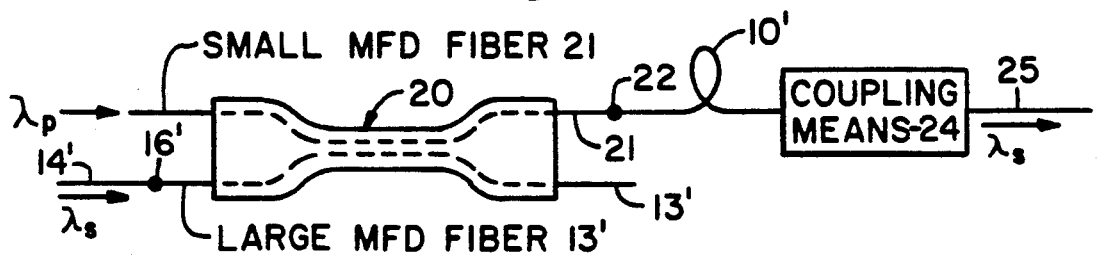
FIG. 2 is a schematic illustration of a fiber amplifier in accordance with the invention.

Referring to FIG. 2, the fiber amplifier of the present invention employs a WDM coupler 20 which is formed of two different optical fibers 21 and 13'. Elements of FIG. 2 that are similar to those of FIG. 1 are represented by primed reference numerals. Fiber 13' is an optical fiber, the MFD of which substantially matches that of telecommunication fiber 14'; indeed, fibers 13' and 14' can be formed of the same type of fiber. Fiber 21 is an optical fiber, the MFD of which matches that of gain fiber 10'; those two fibers being connected by splice 22. In fiber amplifier systems wherein the MFD of the gain fiber is sufficiently small to achieve suitable power density, the ratio of the MFD of fiber 13' to the MFD of fiber 21 is typically at least 1.5:1. It is undesirable for pump power to be applied to a portion of the gain fiber in which the optical signal is not propagating. Therefore, at least that portion of fiber 21 that extends between coupler 20 and the pump source cannot contain lasing dopant. In its simplest form, the entire small MFD coupler fiber is free from lasing dopant.

The relatively large difference between the MFD's of coupler fibers 21 and 13' result in a large difference between propagation constants. The effect of this difference is minimized by utilizing a coupler of the type disclosed in U.S. Pat. No. 4,391,076, which is incorporated herein by reference. In accordance with that patent, the coupled fibers are surrounded by a matrix of glass having a refractive index lower than that of the fiber cladding glass. The cores become so small in the coupling region that their effect on propagation becomes very small. When the fiber cladding diameter becomes sufficiently small, the cladding functions as the light guiding portion of the fiber, and the surrounding low index matrix material functions as the cladding. Power therefore transfers between the contiguously disposed fiber claddings in the coupling region. By controlling the length of the coupling region and the steepness of the transition region between the stretched and unstretched regions of the coupler fibers, the spectral coupling characteristics of the coupler are controlled such that a high percentage of the signal light propagating in the large MFD fiber is coupled to the low MFD fiber and a low percentage of the pump source light propagating in the small MFD fiber is coupled to the large MFD fiber.

If gain fiber 10' is spliced to an outgoing telecommunication fiber 25, that splice will exhibit a loss. A coupling means 24 such as a tapering fiber or a coupler similar to coupler 20 can provide a relatively low loss connection.

Figure 3:
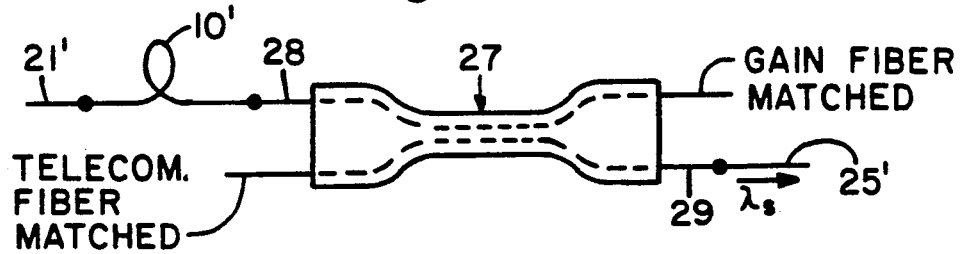
FIG. 3 is a schematic illustration of a fiber amplifier having an output fiber optic coupler.

Coupler 27 of FIG. 3 provides a low loss connection between gain fiber 10' and outgoing telecommunication fiber 25'. The MFD of coupler fiber 28 substantially matches that of gain fiber 10', and the MFD of coupler fiber 29 substantially matches that of telecommunication fiber 25'.

The mismatched mode field coupler of this invention is also useful in fiber amplifiers employing alternate pumping schemes. In the counter-pumping device of FIG. 4, gain fiber 10' is connected to input fiber 32 by a splice 33 or the like. Pumping light of wavelength $\lambda_p$ is coupled to gain fiber 10' by coupler 34 which also couples the amplified signal to output fiber 35.

Figure 4:
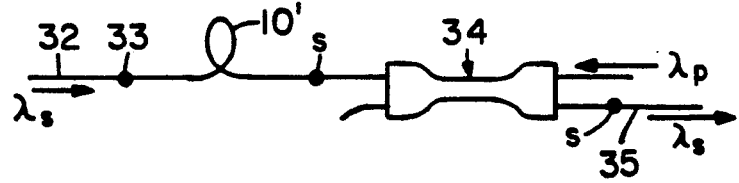
FIGS. 4 and 5 illustrate counter pumping and dual ended devices, respectively.
Figure 5:
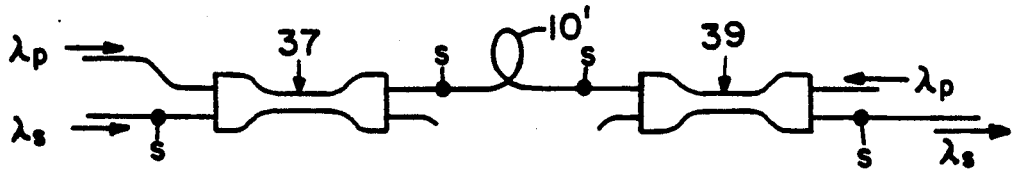

In the dual-ended device of FIG. 5, coupler 37 couples the signal light and one pumping source to gain fiber 10' as described in conjunction with FIG. 2, and coupler 39 couples the signal light and a second pumping source to gain fiber 10' as described in conjunction with FIG. 4. Splices S of FIGS. 4 and 5 are made between fibers of substantially matched MFDs.

As shown in FIG. 6, a mismatched mode field coupler 41 can also be used for introducing light with low insertion loss from laser diode 44 into a telecommunication fiber 45. It is known that the coupling efficiency from a laser diode to a lensed fiber is increased when using a high NA (large core/clad $\Delta$) lensed fiber 42. Coupler 41 is capable of coupling light at telecommunication wavelengths with high efficiency. Splice 46 between coupler fiber 43 and fiber 45 exhibits extremely low insertion loss since the MFDs of those fibers are substantially matched. A similar low loss splice 48 can be made between an input telecommunication fiber 47 and coupler fiber 43, if the device is to be used as an in-line coupler.

The splice loss between the coupler and the gain fiber can be essentially eliminated by employing coupler 50 of FIG. 7. Coupler 50 includes a fiber 51, the MFD of which substantially matches that of telecommunication fibers of the type to which it is adapted to be spliced. Coupler fiber 52 is formed of two optical fibers 53 and 54 which are spliced within the necked down portion of the coupler at interface 55. Fiber 54 is the gain fiber, the core of which contains a lasing dopant. As in the previous embodiments, the MFD of fiber 53 can substantially match that of fiber 54. Alternatively, the MFD of fiber 53 can be different from fiber 54, its MFD being such that it efficiently receives power another fiber or a laser diode source of pumping light. In either case, the effect of any mode field mismatch between fibers 53 and 54 is minimized since that splice is located at point where the $\Delta$ and core diameter of the fiber have little effect, i.e. in the necked-down region of the coupler.

The coupler of the present invention can be formed in accordance with the teachings of the aforementioned U.S. Pat. No. 4,931,076. FIGS. 8 and 9 show a glass tube 60, the axial bore 61 of which has tapered apertures 62 at its ends. The cross-sectional shape of the bore can be circular, diamond-shaped, square, or the like. The softening point temperature of tube 60 should be lower than that of the fibers that are to be inserted therein. Suitable tube compositions are $SiO_2$ doped with 1 to 25 wt. % $B_2O_3$ and $SiO_2$ doped with 0.1 to approximately 2.5 wt. % fluorine. In addition to lowering the softening point temperature of $SiO_2$, $B_2O_3$ and F also decrease its refractive index.

Two coated optical fibers 63 and 64, having protective coatings 65 and 66, respectively, are cut to lengths that are sufficient that a usable length of each fiber extends beyond each end of tube 60. Each of fibers 63 and 64 includes a core and cladding, the radii and refractive indices of the cores being such that the MFD of fiber 64 is larger than that of fiber 63. A portion of the coating intermediate the ends of each fiber is removed for a distance slightly shorter than the length of bore 61. The fibers are threaded through the bore until the uncoated portions are disposed intermediate the ends of the tube. The fibers can be subjected to a slight tension and then clamped. A small amount 69 of glue is applied to one side of the fibers to attach them to one side of tapered aperture 62 while leaving an opening 70 which permits access to bore 61. A drop of glue is similarly applied between the fibers and tapered aperture at the opposite end of the tube. The fibers within the capillary tube are visually checked for internal twists, since they should extend through the tube in a parallel, non-twisted fashion.

An apparatus for performing the tube collapsing and stretching steps is shown in FIG. 10. Chucks 72 and 73, which are used to secure the coupler preform in this apparatus, are mounted on motor controlled stages which are preferably controlled by a computer. Ring burner 74 is capable of evenly heating the capillary tube midregion.

Coupler preform 71 of FIG. 8 is inserted through ring burner 74 and is clamped to the draw chucks. The fibers are threaded through vacuum attachments 75 and 76 which are then affixed to the ends of tube 60. Vacuum attachment 76, which is shown in cross-section in FIG. 10, includes a tube 77 that is attached to the end of tube 60 and a vacuum line 78. The end of tube 77 is clamped to the fibers as indicated by arrows 79.

A vacuum V is applied to both ends of preform 71. The coupler preform is heated by burner 74 for a short period of time, typically between about 12 and 25 seconds, to increase the temperature of the midregion of the tube to the softening temperature. With the assistance of the differential pressure on the tube, the tube collapses onto the fibers. The tube matrix glass surrounds the fibers and fills the aperture to form a solid structure, thereby eliminating airlines in the coupling region.

The central portion of the collapsed midregion of the tube can be stretched without removing the device from the apparatus in which the tube was collapsed. After the tube cools, the flame is reignited, and the center of the collapsed region is reheated. The flame duration for the stretch process, which depends upon the desired coupler characteristics, is usually between 10 and 20 seconds. The shorter heating period for the stretch step results in a stretched region that is shorter than the collapsed region. After the collapsed tube is reheated, stages 72 and 73 pull in opposite directions until the coupler length has been increased by a predetermined amount.

The amount of stretching to which the capillary tube must be subjected to achieve a given type of coupler is initially determined by injecting light power into one input fiber of a collapsed coupler preform and monitoring the output power at the output fibers during the stretch operation. Thereafter, if properly aligned apparatus is employed and if process parameters are carefully controlled, all couplers formed by a specific process will possess similar optical characteristics.

After the coupler has cooled, the vacuum lines are removed from the coupler and a drop of glue is applied to each end of the capillary tube where it flows at least partially into the longitudinal aperture. This produces a hermetic seal and also increases the pull strength of the device.

The following specific example describes a method of making a fiber amplifier and a fiber optic coupler for use in the amplifier.

The coupler fibers and the gain fiber were made by the process disclosed in U.S. Pat. No. 4,486,212 (which is incorporated herein by reference) or by a similar process. Briefly, in accordance with that patent, a porous core preform comprising a core region and a thin layer of cladding glass is formed on a cylindrical mandrel. The mandrel is removed, and the resultant tubular preform is gradually inserted into a consolidation furnace muffle, the maximum temperature of which is between 1200° and 1700° C. and preferably about 1490° C. for high silica content glass. The temperature profile of the muffle is highest in the central region as taught in U.S. Pat. No. 4,165,223, which is incorporated herein by reference. Chlorine, which is present in the minimum concentration that is required to achieve drying, may be supplied to the preform by flowing into the preform aperture a drying gas consisting of helium and about 5 volume percent chlorine. The end of the aperture is plugged to cause the gas to flow through the preform pores. A helium flushing gas is simultaneously flowed through the muffle.

The resultant tubular glass article is stretched in a standard draw furnace while a vacuum is applied to the aperture to form a "core rod" in which the aperture has been closed. A suitable length of the rod is supported in a lathe where particles of silica are deposited thereon. The resultant final porous preform is gradually inserted into the consolidation furnace where it is consolidated while a mixture of 99.5 volume percent helium and 0.5 volume percent chlorine is flowed upwardly therethrough. The resultant glass preform is drawn to form a step-index, single-mode optical fiber.

(a) Forming Standard Telecommunications Fiber 64

A first layer of glass particles comprising $SiO_2$ doped with 8.5 wt. % $GeO_2$ was deposited on a mandrel, and a thin layer of $SiO_2$ particles was deposited on the first layer. The mandrel was removed, and the resultant porous preform was gradually inserted into a furnace having an alumina muffle where it was dried and consolidated. During this process, a gas mixture containing 65 sccm (standard cubic centimeter per minute) chlorine and 650 sccm helium flowed into the center hole where the mandrel had been removed. A flushing gas containing 40 lpm (liter per minute) helium and 0.5 lpm oxygen flowed upwardly from the bottom of the muffle. The aperture was evacuated, and the lower end of the tubular body was heated to 1900° C. and drawn at a rate of about 15 cm/min to form a 5 mm solid glass rod. The rod was severed to form sections, each of which was supported in a lathe where it functioned as a mandrel upon which SiO₂ cladding soot was deposited to form a final porous preform.

One final porous preform was gradually inserted into the alumina muffle of a furnace having a maximum temperature of 1490° C. where it was consolidated to form a draw blank. During the consolidation process, a gas mixture containing 40 lpm helium, 0.5 lpm chlorine and 0.5 lpm oxygen flowed through the muffle. The tip of the draw blank was heated to about 2100° C., and a fiber having an outside diameter of 125 μm was drawn therefrom, the fiber being coated with a 170 μm diameter urethane acrylate coating during drawing.

(b) Forming the Small MFD Coupler Fiber 63

Except for the following differences, a process similar to that described in section (a) was employed to form fiber 63. A first layer of glass particles comprising SiO₂ doped with 18 wt. % GeO₂ was deposited on a mandrel, and a thin layer of SiO₂ particles was deposited on the first layer. The resultant porous core preform was consolidated, stretched and overcoated with pure silica cladding. The ratio of the core diameter to the outside diameter of the resultant draw blank was such that the core was smaller than that of fiber 64 (see Table 1). The fiber was drawn to an outside diameter of 125 μm and was provided with 170 μm diameter urethane acrylate coating.

c. Forming the Gain Fiber

Except for the following differences, a process similar to that described in section (a) was employed to form the gain fiber. A first layer of glass particles comprising SiO₂ doped with 16.8 wt. % GeO₂ was deposited on a mandrel, and a thin layer of SiO₂ particles was deposited on the first layer. The resultant porous core preform was removed from the mandrel and immersed in a solvent containing an erbium salt. The resultant doped porous preform was dried, consolidated, stretched and overcoated with pure silica cladding. The ratio of the core diameter to the outside diameter of the resultant draw blank was similar to that of the draw blank described in section (b) (see Table 1). The fiber was drawn to an outside diameter of 125 μm and was provided with 250 μm diameter urethane acrylate coating.

d. Fiber Characteristics

Table 1 lists $\Delta^{esi}$ (equivalent step index delta), $d_c^{esi}$ (equivalent step index core diameter), and the MFD of these fibers. The mode field parameters were determined using the variable aperture far-field method in accordance with the Petermann II definition of mode field diameter.

TABLE 1

| | $\Delta^{esi}$ | $d_c^{esi}$ | Mode Field Diameter | |
| --- | --- | --- | --- | --- |
| | | | at 1550 nm | at 1000 nm |
| Fiber 64 | 0.0036 | 8.3 μm | 10.5 μm | 5.7 μm |
| Fiber 63 | 0.008 | 3.5 μm | 6.4 μm | 3.7 μm |
| Gain Fiber | 0.0092 | 3.3 μm | 6.5 μm | 4.0 μm |

The splice loss between various of these fibers is listed in Table 2.

TABLE 2

| | Splice Loss | |
| --- | --- | --- |
| Spliced Fibers | at 1536 nm | at 980 nm |
| Fiber 64 & Gain Fiber | 0.5 dB | 1.7 dB |

TABLE 2-continued

| | Splice Loss | |
| --- | --- | --- |
| Spliced Fibers | at 1536 nm | at 980 nm |
| Fiber 63 & Gain Fiber | 0.1 dB | 0.1 dB | e. Forming the Coupler

Glass capillary tube 60 had a 3.8 cm length and an outside diameter of 2.8 mm. The bore was diamond shaped, each side of the diamond having a length of about 310 μm. The capillary tube was formed by a flame hydrolysis process; its composition adjacent the bore consisted of silica doped with about 2 wt. % B₂O₃ and about 2 wt. % fluorine. The composition varied radially due to diffusion and leaching. Each tapered aperture 62 was formed by flowing NF₃ through the tube while heating the end of the tube.

Optical fibers 63 and 64, having protective coatings 65 and 66, respectively, were cut to lengths of about 2 meters. A section of coating about 2.8 cm long was removed from the central region of each fiber. The fibers were threaded through the bore until the uncoated portions were disposed intermediate the ends of the tube. The fibers were subjected to a slight tension and then clamped. A small amount of glue was applied to one side of the fibers to attach them to one side of tapered aperture 62 as shown in FIGS. 8 and 9. A drop of glue was then applied between the fibers and tapered aperture at the opposite end of the tube. The fibers within the capillary tube were visually checked to ascertain that there were no internal twists.

Coupler preform 71 was inserted through ring burner 74 and clamped to draw chucks 72 and 73 of the apparatus of FIG. 10. Vacuum attachments 75 and 76 were secured to the ends of the tube and were clamped (arrows 79) to apply to preform 71 a vacuum that was allowed to stabilize at approximately 46 cm (18 inches) of Hg.

Gas and oxygen were flowed to the ring burner at 0.55 slpm (standard liters per minute) and 1.1 slpm, respectively. The ring burner was turned on for about 18 seconds to increase the temperature of the midregion of the tube to its softening temperature. This caused tube to collapse onto the fibers along a section of the tube about 0.5 cm long. After the coupler preform cooled for about 30 seconds, the flame was reignited with the gas and oxygen flows being the same as for the tube collapse step, and the collapsed region was reheated for about 17 seconds. The vacuum remained at approximately 46 cm of Hg. Stages 72 and 73 moved in opposite directions at a rate of about 2.0 cm/sec to provide a total increase in coupler length of about 1.62 cm.

After the coupler had cooled, the vacuum lines were removed from the coupler, and a drop of adhesive was applied to each end of the capillary tube and was exposed to UV light for 60 seconds. The coupler was then removed from the draw.

Figure 11:
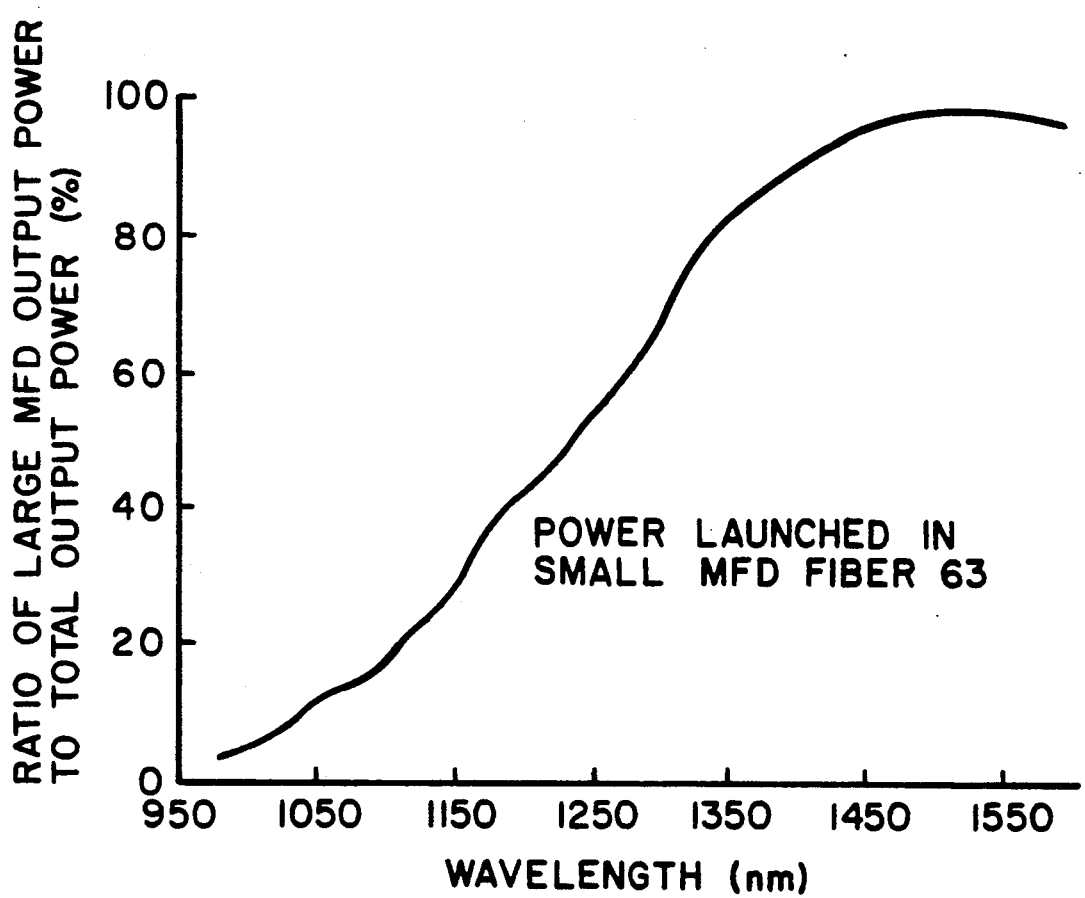
FIG. 11 is a graph of coupled power v. wavelength for a coupler formed in accordance with the invention.

Low insertion loss couplers have been produced by the above-described process. One such coupler had an insertion loss at 980 nm of 0.34 dB (coupling ratio of 4.6% and excess loss of 0.14 dB) and an insertion loss at 1540 nm of 0.12 dB (coupling ratio of 97.90% and excess loss of 0.01 dB). The coupling curve appears in FIG. 11.

We claim:

1. A fiber amplifier system comprising
   gain fiber means for amplifying optical signals,
   fiber optic coupler means having first and second coupler optical fibers, one end of said first coupler fiber being connected to said gain fiber means, the mode field diameter of said first coupler fiber being substantially matched to that of said gain fiber means and being smaller than that of said second coupler fiber, a portion of said coupler fibers being situated in a wavelength dependent light transfer relationship whereby most of the light power of a wavelength $\lambda_s$ couples between said first and second coupler fibers, and most of the light power of a wavelength $\lambda_p$ that is introduced into said first coupler fiber remains in said first coupler fiber,
   input signal means for introducing light power of wavelength $\lambda_s$ into said gain fiber means, and
   pump source means for introducing pumping light power of wavelength $\lambda_p$ to said first coupler fiber.

2. A system in accordance with claim 1 wherein said input signal means comprises a transmission optical fiber for propagating an optical signal at wavelength $\lambda_s$, said transmission optical fiber being connected to said second coupler fiber.

3. A system in accordance with claim 1 wherein said input signal means comprises a transmission optical fiber an end of which is connected to said gain fiber means, an output transmission optical fiber being connected to said second coupler fiber.

4. A system in accordance with claim 1 wherein said pump source means comprises a light source of wavelength $\lambda_p$ coupled to said first coupler fiber.

5. A system in accordance with claim 1 wherein said first coupler fiber is fusion spliced to said gain fiber means.

6. A system in accordance with claim 1 wherein the connection between said first coupler fiber and said gain fiber is a fusion splice that is located within said portion of said coupler.

7. A fiber amplifier system comprising
   gain fiber means for amplifying optical signals supplied to an end thereof, said gain fiber means including core and cladding regions, the characteristics of which are such that light propagating therethrough has a first mode field diameter,
   fiber optic coupler means having first and second coupler optical fibers having input and output ends, the mode field diameter of said first coupler fiber being substantially matched to said first mode field diameter and being smaller than that of said second coupler fiber, a portion of said coupler fibers within said coupler means being situated in a wavelength dependent light transfer relationship whereby most of the light power of wavelength $\lambda_s$ couples between said first and second coupler fibers, and most of the light power of a wavelength $\lambda_p$ that is introduced into said first coupler fiber remains in said first coupler fiber, the output end of said first coupler fiber being connected to said end of said gain fiber means,
   transmission optical fiber means for propagating an optical signal at wavelength $\lambda_s$, said transmission optical fiber means being connected to the input end of said second coupler fiber, and
   pump source means for introducing pumping light power of wavelength $\lambda_p$ to said first coupler fiber.

8. A system in accordance with claim 7 wherein the output end of said first coupler fiber is fusion spliced to said end of said gain fiber means.

9. A system in accordance with claim 7 wherein said input signal means comprises a transmission optical fiber that is fusion spliced to said input end of said second coupler fiber.

10. A system in accordance with claim 7 wherein the ratio of the mode field diameter of said second coupler fiber to that of said first coupler fiber is at least 1.5:1.

11. A system in accordance with claim 7 wherein said first coupler fiber is spliced to said gain fiber in said coupler.

12. A fiber amplifier comprising
    gain fiber means for amplifying optical signals, and
    fiber optic coupler means having first and second coupler optical fibers, one end of said first coupler fiber being connected to said gain fiber means, the mode field diameter of said first coupler fiber being substantially matched to that of said gain fiber means and being smaller than that of said second coupler fiber, a portion of said coupler fibers being situated in a wavelength dependent light transfer relationship whereby most of the light power of a wavelength $\lambda_s$ couples between said first and second coupler fibers, and most of the light power of a wavelength $\lambda_p$ that is introduced into said first fiber remains in said first coupler fiber.

13. A system in accordance with claim 12 wherein said one end of said first coupler fiber is fusion spliced to said one end of said gain fiber means.

14. A system in accordance with claim 12 wherein the connection between said first coupler fiber and said gain fiber is located within said coupler.

15. A wavelength division multiplexer fiber optic coupler of the type in which most of the light power of a wavelength $\lambda_p$ that is introduced into a first coupler fiber remains in that fiber and most of the light power of a wavelength $\lambda_s$ that is introduced into the first coupler fiber couples to a second coupler fiber, said coupler being of the type comprising
    an elongated body of matrix glass having refractive index $n_3$, said body having two opposed endfaces and a midregion, said fibers extending longitudinally through said elongated body and being fused together along with the midregion of said body, the cores of said fibers being more closely spaced at the central portion of said midregion than at said body endfaces, each of said fibers comprising a core surrounded by a cladding of refractive index less than that of said core but greater than $n_3$,
    characterized in that the mode field diameter of at least a portion of said first fiber is smaller than that of said second fiber.

16. A coupler in accordance with claim 15 wherein said first fiber comprises a single fiber having a substantially uniform mode field diameter throughout its length.

17. A coupler in accordance with claim 15 wherein said first coupler fiber comprises two fiber segments that are fused together within the midregion of said matrix glass.

18. A coupler in accordance with claim 17 wherein one of said fiber segments comprises a gain fiber having a core that is doped with lasing material.

19. A coupler in accordance with claim 17 wherein the mode field diameters of said two fiber segments are substantially matched.

20. A coupler in accordance with claim 17 wherein the mode field diameters of said two fiber segments are different.

21. A coupler in accordance with claim 17 wherein the ratio of the mode field diameter of said second coupler fiber to that of said first coupler fiber is at least 1.5:1.

22. A wavelength division multiplexer fiber optic coupler of the type in which most of the light power of a wavelength $\lambda_p$ that is introduced into a first coupler fiber remains in that fiber and most of the light power of a wavelength $\lambda_s$ that is introduced into the first coupler fiber couples to a second coupler fiber, said coupler being of the type comprising at least first and second optical fibers, each having a core and a cladding, said fibers being fused together along a portion of the lengths thereof to form a coupling region, characterized in that said first coupler fiber comprises two fiber segments that are fused together end-to-end within said coupling region, and in that the mode field diameter of at least one of the segments of said first fiber is smaller than that of said second fiber.

23. A coupler in accordance with claim 22 wherein the ratio of the mode field diameter of said second coupler fiber to that of said first coupler fiber is at least 1.5:1.

24. A coupler in accordance with claim 22 wherein one of said fiber segments comprises a gain fiber having a core that is doped with lasing material.

25. A coupler in accordance with claim 22 wherein the mode field diameters of said two fiber segments are different.

26. A coupler in accordance with claim 22 wherein the mode field diameters of said two fiber segments are substantially matched.

27. A wavelength division multiplexer fiber optic coupler comprising an elongated body of matrix glass having a refractive index $n_3$, said body having two opposed endfaces and a midregion, said fibers extending longitudinally through said elongated body and being fused together along with the midregion of said body, the cores of said fibers being more closely spaced at the central portion of said midregion than at said body endfaces, each of said fibers comprising a core surrounded by a cladding of refractive index less than that of said core but greater than $n_3$, characterized in that the mode field diameter of at least a portion of said first fiber is smaller than that of said second fiber.

28. A wavelength division multiplexer fiber optic coupler comprising at least first and second optical fibers, each having a core and a cladding, said fibers being fused together along a portion of the lengths thereof to form a coupling region, characterized in that said first coupler fiber comprises two fiber segments that are fused together end-to-end within said coupling region, and in that the mode field diameter of at least one of the segments of said first fiber is smaller than that of said second fiber.

29. A fiber amplifier system comprising gain fiber means for amplifying optical signals, fiber optic coupler means optically coupled to said gain fiber means and having first and second coupler optical fibers, the mode field diameter of said first coupler fiber being substantially matched to that of said gain fiber means and being smaller than that of said second coupler fiber, a portion of said coupler fibers being situated in a wavelength dependent light transfer relationship whereby most of the light power of a wavelength $\lambda_s$ couples between said first and second coupler fibers, and most of the light power of a wavelength $\lambda_p$ that is introduced into said first coupler fiber remains in said first coupler fiber, input signal means for introducing light power of wavelength $\lambda_s$ into said gain fiber means, and pump source means for introducing pumping light power of wavelength $\lambda_p$ to said first coupler fiber.

30. A system in accordance with claim 29 wherein said gain fiber means forms one of the legs of said fiber optic coupler means.

31. A fiber amplifier system comprising fiber optic coupler means having first and second coupler optical fibers, the mode field diameter of said first coupler fiber being smaller than that of said second coupler fiber, a portion of said coupler fibers being situated in a wavelength dependent light transfer relationship whereby most of the light power of a wavelength $\lambda_s$ couples between said first and second coupler fibers, and most of the light power of a wavelength $\lambda_p$ that is introduced into said first coupler fiber remains in said first coupler fiber, said first fiber having first and second legs that extend from said coupling region in opposite directions, said second fiber having third and fourth legs that extend from said coupling region in opposite directions, said first and third legs extending from said coupling region in the same direction, said second leg constituting gain fiber means for amplifying optical signals, input signal means for introducing light power of wavelength $\lambda_s$ into said third leg, and pump source means for introducing pumping light power of wavelength $\lambda_p$ to said first leg.

* * * * *